United States Patent [19]

Weir

[11] Patent Number: 4,606,763

[45] Date of Patent: Aug. 19, 1986

[54] PROCESS FOR THE PRESSURE OXIDATION ACID LEACHING OF NON-FERROUS METAL AND IRON-CONTAINING SULPHIDIC MATERIAL

[75] Inventor: Donald R. Weir, Fort Saskatchewan, Canada

[73] Assignee: Sherritt Gordon Mines Limited, Toronto, Canada

[21] Appl. No.: 707,920

[22] Filed: Mar. 4, 1985

[30] Foreign Application Priority Data

Sep. 19, 1984 [CA] Canada .................................. 463634

[51] Int. Cl.[4] .............................................. C22B 3/00
[52] U.S. Cl. ....................................... 75/101 R; 75/2;
75/115; 75/119; 75/118 R; 75/121; 423/22;
423/27; 423/36; 423/45; 423/98; 423/109;
423/150; 423/509; 423/87; 266/168
[58] Field of Search ................. 423/150, 109, 509, 27,
423/22, 36, 87, 45, 98; 75/101 R, 121, 118 R,
119, 2, 115; 266/168

[56] References Cited

U.S. PATENT DOCUMENTS 4,124,462 10/1978 Reinhardt et al. ................ 75/101 R
4,431,613 2/1984 Verbaan ............................. 423/36

Primary Examiner—John Doll
Assistant Examiner—Robert L. Stoll
Attorney, Agent, or Firm—Robert F. Delbridge; Arne I. Fors

[57] ABSTRACT

A process for the pressure oxidation leaching of non-ferrous metal sulphidic material which comprises providing an autoclave assembly which has a series of successive compartments, the first compartment of which being substantially larger in size than each of the remaining compartments. An oxygen partial pressure is provided in the autoclave assembly in the range of from about 50 to about 2000 kPa. An aqueous slurry of the material is fed into the relatively large first compartment with resultant flow of the material through the successive smaller compartments causing the temperature in the first and successive compartments to be sufficient to produce autogeneous oxidation of the sulphidic material. The oxidized slurry from the last compartment of the series is discharged.

17 Claims, 2 Drawing Figures

PROCESS FOR THE PRESSURE OXIDATION ACID LEACHING OF NON-FERROUS METAL AND IRON-CONTAINING SULPHIDIC MATERIAL

This invention relates to the recovery of nonferrous metal values, for example zinc, nickel, copper, lead, cobalt or gold values, from sulphidic material by pressure oxidation leaching in an autoclave assembly through which the material is continuously passed.

It is well known that the pressure oxidation of such sulphidic material is an exothermic reaction. In the past, it has been customary to carry out such a reaction in a multicompartment autoclave, with successive compartments being separated by dividers and with each cell containing an agitator. The sulphidic material to be oxidized is introduced as a slurry into the autoclave at one end, and the slurry flows from one compartment to another over the respective dividers, leaving the autoclave at the other end. Oxygen is supplied to the autoclave compartments to effect the oxidation.

With present practice, it has usually been necessary to supply heat to the first autoclave compartment, for example by steam injection or by preheating the feed slurry, in order to maintain the reaction. For example, to oxidize pyrite ($FeS_2$), it is necessary that the temperature be at least about 165° C., so that preheating is often required to ensure initiation of the exothermic reaction. In subsequent compartments, the heat generated by the pressure oxidation reaction is likely to raise the temperature of the slurry to an undesirably high value, with the result that cooling is necessary. Undesirably high temperatures, and hence also undesirably high pressures, should be prevented because of limitations with respect to the strength of the autoclave. The necessity for supplying heat to the first compartment and for cooling subsequent compartments represents wasted energy and is detrimental to economic operation.

The present invention is based on the discovery that the temperature in the various autoclave compartments can be maintained at optimum values, without the necessity for a substantial amount of external heat or cooling and utilizing the exothermic nature of the reaction, by the use of an autoclave assembly in which the first compartment is substantially larger than each of the subsequent compartments, so as to allow a greater degree of reaction to occur in the first compartment and thereby causing a higher temperature therein. Advantageously, the volume of the first compartment is from about 50 to about 200% larger than each successive compartment.

The invention is applicable to the various kinds of non-ferrous metal and iron-containing sulphidic materials conventionally subjected to pressure oxidation, for example ores, concentrates and mattes.

Although some external heat may be necessary on start-up, the greater volume of slurry in the first compartment compared to that in each of the successive compartments enables the slurry in the first compartment to remain at a substantially high temperature to actuate the pressure oxidation reaction in incoming sulphidic material, while also enabling the slurry in the successive compartments to remain at adequate temperatures which are not too high. Thus, in a continuous operation, it becomes unnecessary with the present invention to preheat slurry feed to the first compartment with an external heat source to the same extent as required previously, or to cool successive compartments, to the same extent as required previously, thereby obtaining a considerable saving in energy. It is consequently also possible to achieve a higher throughput of sulphidic material than would otherwise be the case. Also, undesirably steep increases in temperature from one compartment to another, such as occur in the prior art, can be avoided.

The autoclave assembly will usually comprise a single horizontal autoclave divided into successive compartments by dividers. Compared with conventional autoclaves, it has been found that the dividers of an autoclave in accordance with the present invention may be higher, with the result that the actual volume of an autoclave in accordance with the present invention may be increased by up to 10% compared to conventional autoclaves.

It is also within the scope of the invention for the autoclave assembly to comprise two or more pressurized vessels arranged in parallel which form the "first compartment", and which feed, for example by gravity, into a succession of pressure vessels of similar size arranged in series which form the successive compartments.

According to a further feature of the invention, slurry or solution may be injected into one or more successive compartments, for example to the third compartment, in order to control the temperature in a cooling manner in successive compartments. This feature also increases slurry retention time in the first compartment, and therefore provides an additional means of controlling the temperature of the slurry in the various compartments which does not require the use of external heat or cooling.

Advantageously, the pulp density of the slurry in the first compartment may be higher than in the successive compartments so that a smaller heat sink is provided in the first compartment, thus allowing an even higher temperature to be achieved with the same degree of reaction. For example, the pulp density in the first compartment may be from about 5 to about 60% solids, with the pulp density in successive compartments being from about 3 to about 40% solids.

Embodiments of the invention will now be described, by way of example, with reference to the accompanying drawings in which.

Figure 1:
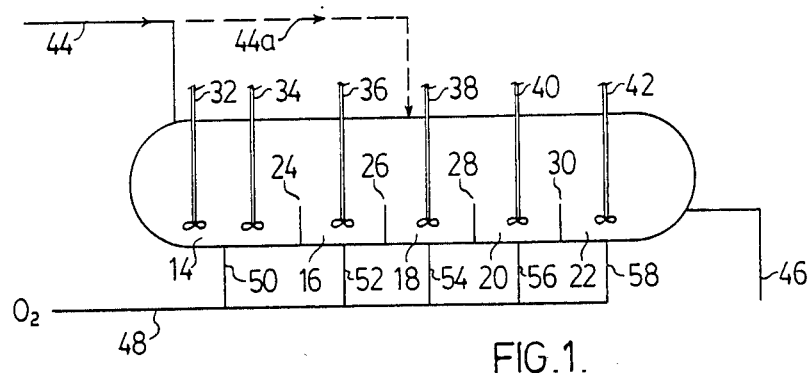
FIG. 1 is a diagrammatic view of a horizontal autoclave assembly.

Referring first to FIG. 1, an elongated horizontal autoclave 12 has five successive compartments 14, 16, 18, 20, 22 separated by dividers 24, 26, 28, 30. The first compartment 14 is approximately twice the size of each of the other compartments. Agitators are provided to agitate the contents of each compartment, there being two agitators 32, 34 in the first compartment 14, with the successive compartments 16, 18, 20, 22 containing agitators 36, 38, 40, 42 respectively.

An acidic feed slurry of non-ferrous metal and iron-containing sulphidic material is fed through feed line 44 into the first compartment 14, and passes through successive compartments 16, 18, 20 and 22 before being discharged from the last compartment 22 through a discharge line 46. Oxygen is supplied to each compartment 14, 16, 18, 20, 22 through an oxygen supply line 48 which has branch lines 50, 52, 54, 56, 58 to the respective compartments. As shown, the dividers 24, 26, 28, 30 are successively lower in height, with the slurry flowing over each divider from one compartment to another.

A typical zinc and iron-containing sulphidic material may contain (by weight) from about 20 to about 60% zinc, from about 35 to about 3% iron, and from about 38 to about 30% sulphur. A typical refractory gold ore or concentrate may contain from about 3 to about 300 g/t gold, from about 3 to about 45% iron, from about 1 to about 45% sulphur, and from about 0.1 to about 30% arsenic. A typical copper-nickel matte may contain from about 30 to about 70% nickel, about 40 to about 3% copper, and from about 5 to about 25% sulphur. Platinum group metals may also be present.

The incoming feed slurry may for example have a pulp density of from about 35 to about 85% solids, with the pulp density in the first compartment 14 being from about 5 to about 60% solids, and the pulp density in each of the successive compartments being from less than about 0.1% to about 60% solids.

Although the reactions are complex, the following equations illustrate typical reactions occurring in the pressure oxidation acid leaching of zinc and iron-containing sulphidic material:

$$ZnS + Fe_2(SO_4)_3 \rightarrow ZnSO_4 + 2FeSO_4 + S°$$

$$FeS + 2O_2 \rightarrow FeSO_4$$

$$2FeSO_4 + H_2SO_4 + 0.5O_2 \rightarrow Fe_2(SO_4)_3 + H_2O$$

For such zinc-containing material, the oxygen overpressure may be from about 200 to about 2000 kPa. The temperature of the large first compartment 14 may be from about 135° to about 150° C., and the temperature of each other compartment may be from about 145° to about 155° C.

Refractory gold ore or concentrates typically contain pyrite and/or arsenopyrite which must be oxidized to liberate the gold. Pyrite ($FeS_2$) especially is a very refractory compound and hence requires a relatively high temperature of at least about 165° C. for oxidation to occur reasonably rapidly in accordance with the following equation:

$$2FeS_2 + 7O_2 + 2H_2O \rightarrow 2FeSO_4 + 2H_2SO_4$$

The large volume of the first compartment 14 results in a high degree of sulphur oxidation occurring in the first compartment. Since it is such sulphur oxidation which creates the heat to maintain an autogeneous temperature, the heat produced in this manner in the first compartment provides the required heat for pyrite oxidation in the first compartment. During start-up, heat may of course have to be supplied to the first compartment 14 or the feed slurry may have to be preheated in a manner which is well known to a person skilled in the art.

During continuous operation, the temperature in each autoclave compartment can be controlled by adjusting the solids content of the feed slurry through feed line 44. Also, besides feeding slurry into the first compartment 14, water or recycled process solution may also be fed through feed line 44a into one or more of the other compartments such as the third compartment 18 as indicated in dotted outline in FIG. 1, in order to provide a heat sink for cooling purposes. Alternatively, water or recycled process solution may be fed through line 44a.

Figure 2:
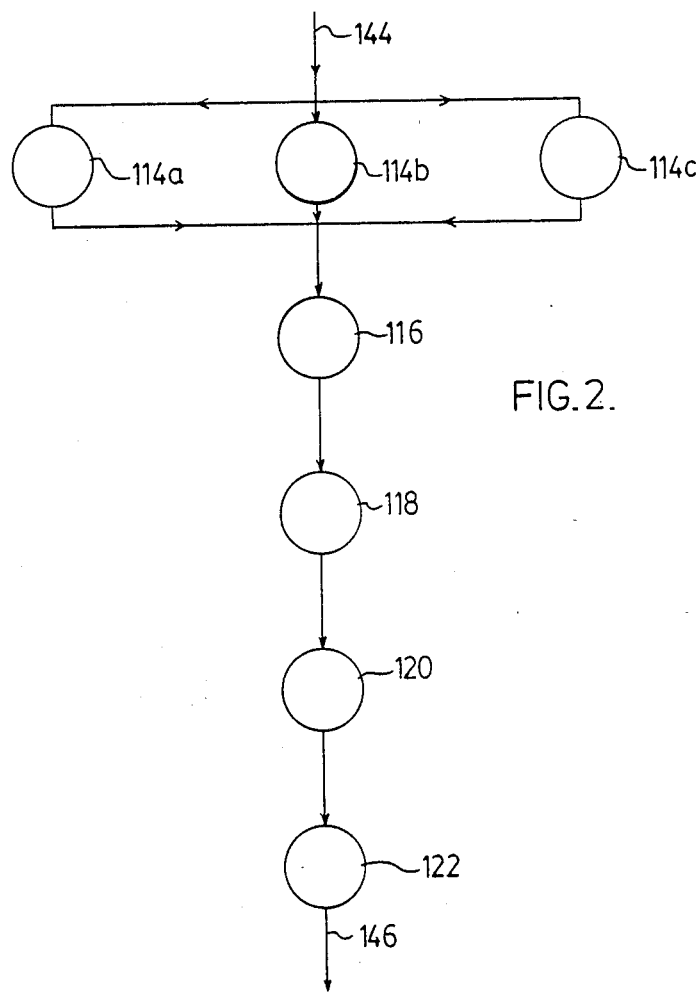
FIG. 2 is a similar view of a vertical autoclave assembly.

FIG. 2 shows an alternative arrangement in which the autoclave assembly comprises a number of separate pressure vessels, each equipped with an agitator and supplied with oxygen. The larger first compartment is made up of three pressure vessels 114a, 114b and 114c arranged in first compartment vessels discharge into successive compartments formed by vessels 116, 118, 120 and 122 arranged in series. The last vessel 122 discharges into discharge line 146. The arrangement otherwise operates in a similar manner to the first embodiment described with reference to FIG. 1.

The invention is also useful in the treatment of iron-containing complex sulpho salts containing antimony and/or arsenic, as well as selenides and tellurides. The material may comprise selenides and tellurides containing at least one of the group consisting of gold, silver, platinum, palladium, osmium, iridium, ruthenium, rhenium, rhodium and rubidium.

Other embodiments of the invention will be readily apparent to a person skilled in the art, the scope of the invention being defined in the appended claims.

What I claim as new and desire to protect by Letters Patent of the United States is:

1. A process for the pressure oxidation leaching of non-ferrous metal sulphidic material comprising providing an autoclave assembly having a series of successive compartments, with a first compartment having a size of from about 50 to about 200% larger than each of the remaining compartments, providing an oxygen partial pressure in the autoclave assembly in the range of from about 50 to about 2000 kPa, feeding an aqueous slurry of said material into the relatively large first compartment with resultant flow of the material through the successive smaller compartments to cause the temperature in the first and successive compartments to be sufficient to produce autogeneous oxidation of said sulphidic material, and discharging the oxidized slurry from the last compartment of the series.

2. A process according to claim 1 including also feeding aqueous slurry or solution into a compartment subsequent to the first for cooling purposes.

3. A process according to claim 1 wherein said autoclave assembly comprises an elongated substantially horizontal pressure vessel containing said series of successive compartments.

4. A process according to claim 1 wherein the material comprises zinc and iron-containing sulphidic material.

5. A process according to claim 1 wherein the material comprises nickel and iron-containing sulphidic material.

6. A process according to claim 1 wherein the material comprises gold and iron-containing sulphidic material.

7. A process according to claim 1 wherein the material comprises cobalt and iron-containing sulphidic material.

8. A process according to claim 1 wherein the material comprises copper and iron-containing sulphidic material.

9. A process according to claim 1 wherein the material comprises lead and iron-containing sulphidic material.

10. A process according to claim 1 wherein the material comprises matte containing at least one of the group consisting of nickel, copper and platinum group metals.

11. A process according to claim 1 wherein the material comprises refractory auriferous iron-containing sulphidic material.

12. A process according to claim 1 wherein the material comprises complex so-called sulpho salts also containing at least one of the group consisting of antimony, arsenic, selenides and tellurides.

13. A process according to claim 1 wherein the material comprises selenides and tellurides containing at least one of the group consisting of gold, silver, platinum, palladium, osmium, iridium, ruthenium, rhenium, rhodium and rubidium.

14. A process according to claim 1 wherein the first compartment contains a plurality of agitators.

15. A process according to claim 4 wherein each remaining compartment contains a single agitator.

16. A process according to claim 1 wherein slurry in the larger first compartment has a pulp density of from about 5 to about 60% solids, and the slurry in the successive compartments has a pulp density of from about 3 to about 40% solids.

17. A process according to claim 1 wherein the first compartment is about twice the size of each successive compartments.

* * * * *